A. P. MERRILL.
ROTARY SHAFT AND COUPLING FOR ELECTRIC DENTAL ENGINES.
APPLICATION FILED JULY 7, 1919.
1,328,095.   Patented Jan. 13, 1920.
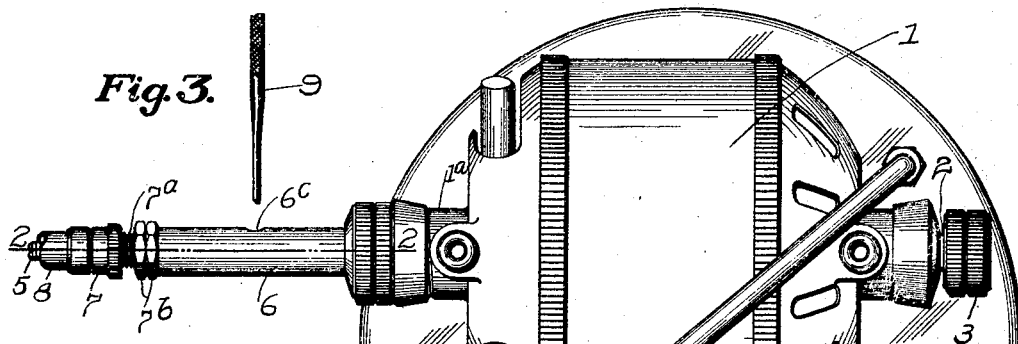
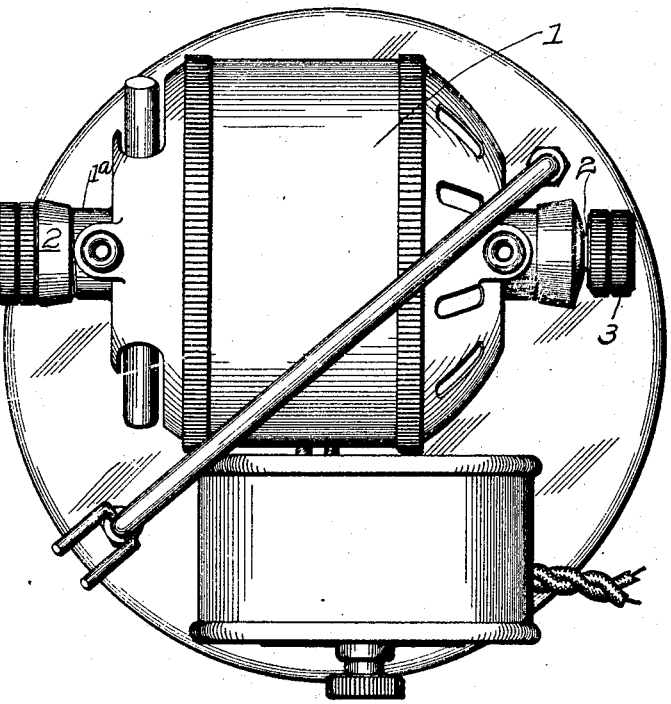
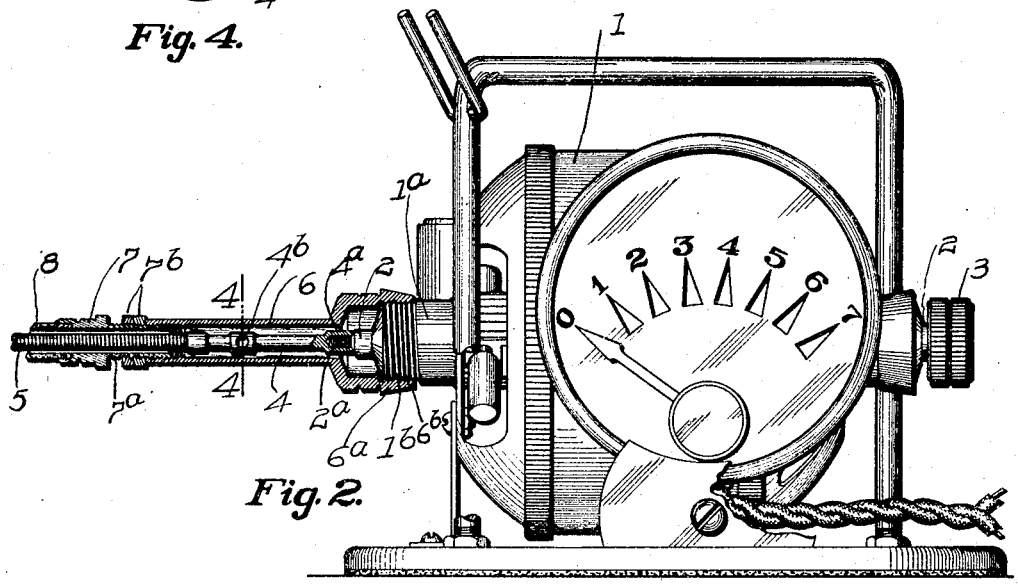
INVENTOR.
ALFRED P. MERRILL.
BY A. B. Bowman
ATTORNEY.

UNITED STATES PATENT OFFICE.

ALFRED P. MERRILL, OF SAN DIEGO, CALIFORNIA.

ROTARY SHAFT AND COUPLING FOR ELECTRIC DENTAL ENGINES.

1,328,095.  Specification of Letters Patent.  Patented Jan. 13, 1920.

Application filed July 7, 1919. Serial No. 309,018.

*To all whom it may concern:*

Be it known that I, ALFRED P. MERRILL, a subject of the King of England, residing at San Diego, in the county of San Diego and State of California, have invented certain new and useful Improvements in Rotary Shafts and Couplings for Electric Dental Engines, of which the following is a specification.

My invention relates to a rotary shaft and coupling for motors more particularly adapted for use in connection with electric, dental and surgical engines and the objects of my invention are: first, to provide a novelly constructed shaft and coupling for motors; second, to provide a novelly constructed coupling for rotary shafts; third, to provide a coupling of this class in which a portion of the shaft is readily detachable from the main drive shaft portion; fourth, to provide a motor shaft for small engines with means to facilitate the manual revolving of the shaft independent of the engine operating means; fifth, to provide a novelly constructed means for coupling a flexible shaft with an engine drive shaft and means for covering said coupling means, operative relatively therewith and sixth, to provide a shaft and coupling means of this class which is very simple and economical of construction, durable, easy to operate, easy to install, easy to connect and disconnect and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a plan view of a dental or surgical engine provided with my shaft and coupling means in connection therewith; Fig. 2 is a side elevational view of such engines showing the shaft coupling and cover means in section through 2—2 of Fig. 1; Fig. 3 is a side elevational view of the key member to be used in connection with said shaft for coupling and uncoupling the same and Fig. 4 is a sectional view on an enlarged scale through 4—4 of Fig. 2.

Similar characters of reference refer to similar parts and portions throughout the several views of the drawings.

The engine 1, main engine shaft 2, hand wheel 3, coupling member 4, shaft 5, cover coupling sleeve 6, cover coupling member 7, cover 8, and key 9 constitute the principal parts and portions of my rotary shaft and coupling.

The dental engine 1 may be any conventional form of engine (the engine structure being no part of my present invention.) It is however provided with a shaft support $1^a$ extending slightly from one side which is provided with an external thread $1^b$. Mounted in this support in the conventional manner is the main engine shaft 2 which is provided on its one end with a milled hand wheel 3 adapted to facilitate its being turned by hand. At its opposite end it is provided with a reduced threaded portion $2^a$ which is adapted for the threaded socket $4^a$ of the coupling 4. This coupling 4 is provided with a hole $4^b$ intermediate its ends adapted for the insertion of the key member 9 and said coupling is connected at its opposite end from the socket with a shaft 5, in this case I have shown a flexible cable. Mounted over this shaft 5 is the usual covering 8 and secured to this covering 8 is the cover coupling member 7 which is provided with an external thread $7^a$ adapted for the internal threads in the end of the sleeve member 6. Also mounted on this member 7 is a pair of lock nuts $7^b$, one of which engages the end of the sleeve 6 and they are for the purpose of securing the sleeve 6 relatively to the member 7. This member 6 is provided on its opposite end with an enlarged portion $6^a$ with internal threads $6^b$ adapted to screw on to the threads $1^b$ on the stationary engine portion $1^a$. This sleeve member 6 is also provided with a hole $6^c$ through which the key 9 is inserted into the hole $4^b$ in the coupling 4, when it is desired to couple and uncouple the shafts.

It will be noted that the threads $1^b$ and the threads on the portion $2^a$ of the shaft 2 are in certain relative position to each other so that they turn off and on in approximately the same time when held in certain relative torsional position by the key 9.

Though I have shown and described a particular construction, combination and arrangement of parts and portions I do not wish to be limited to this particular construction, combination and arrangement but desire to include in the purview of my invention the construction, combination and arrangement substantially as set forth in the appended claims.

It is obvious that with this construction there is provided a motor shaft with means to facilitate its being turned manually. That there is provided a coupling means for coupling the shaft and cover in unison. That when the key 9 is removed the shaft 2, coupling member 4 and shaft 5 will revolve independent of the cover. That the shaft as a whole is very simple and economical of construction and easy to connect and disconnect.

Having thus described my invention what I claim as new and desire to secure by Letters Patent, is:

1. In a device of the class described, the combination with a motor, of a motor shaft extending some distance from opposite sides of said motor provided with a threaded end, a coupling detachably connected to the shaft at its threaded end comprising a shaft coupling threaded at one end adapted for the threaded end of said shaft and provided with a hole intermediate its ends and secured to another shaft at its opposite end and a cover member adapted to be screwed on to a stationary portion of said motor, and having a hole adapted for the insertion of a key into the hole in said coupling, whereby, said coupling and said cover may be removed simultaneously or the coupling revolved independent of said cover member.

2. In a device of the class described, the combination of a motor casing provided with an extended external threaded shaft support, a shaft having its opposite ends extending beyond said extended portion, a flexible shaft detachably connected to one end of said shaft, a handle secured to the other end of said shaft for manually controlling the revolution of said shaft, a sleeve surrounding said flexible shaft and formed with an opening adapted to register with an opening in said flexible shaft to facilitate the manual control of the revolution of said flexible shaft.

3. In a device of the class described, the combination of a motor casing provided with an extended external threaded shaft support, a shaft having its opposite ends extending beyond said extended portion, a flexible shaft detachably connected to one end of said shaft, a handle secured to the other end of said shaft for manually controlling the revolution of said shaft, a sleeve surrounding said flexible shaft and formed with an opening adapted to register with an opening in said flexible shaft and a key adapted to be inserted in said opening and said flexible shaft for manually controlling the revolution of said flexible shaft relatively to said first mentioned shaft.

4. In a device of the class described, the combination with a motor of a shaft revolubly mounted in said motor, a flexible shaft detachably connected to one end of said shaft, a handle secured to the other end of said shaft for manually controlling the revolution of said shaft, a sleeve surrounding said flexible shaft formed with an opening adapted to register with an opening in said flexible shaft to facilitate the manual control of the revolution of said flexible shaft.

In testimony whereof I have hereunto set my hand at San Diego, California, this 30th day of June, 1919.

ALFRED P. MERRILL.